United States Patent
Meisenbichler et al.

(10) Patent No.: US 9,222,561 B2
(45) Date of Patent: Dec. 29, 2015

(54) TRANSMISSION FOR USE IN SHREDDING MACHINES

(71) Applicants: Komptech Umwelttechnik GmbH, Frohnleiten (AT); GKN Walterscheid GmbH, Lohmar (DE)

(72) Inventors: Reinhard Meisenbichler, St. Marein (AT); Peter Woschizka, Leoben (AT); Christian Oberwinkler, Leoben (AT); Gerd Diessner, Crostau (DE); Maik Sterzel, Kubschuetz (DE); Eric Zickler, Sohland (DE)

(73) Assignees: Komptech Umwelttechnik GmbH, Frohnleiten (AT); GKN Wallerscheid GmbH, Lohmar (DE)

( * ) Notice: Subject to any disclaimer, the term of this patent is extended or adjusted under 35 U.S.C. 154(b) by 0 days.

(21) Appl. No.: 14/087,124

(22) Filed: Nov. 22, 2013

(65) Prior Publication Data
US 2014/0323261 A1 Oct. 30, 2014

(30) Foreign Application Priority Data
Apr. 29, 2013 (DE) .................... 20 2013 004 051 U

(51) Int. Cl.
| F16H 37/06 | (2006.01) |
| F16H 37/04 | (2006.01) |
| F16H 35/10 | (2006.01) |
| F16H 3/093 | (2006.01) |
| B02C 18/24 | (2006.01) |

(52) U.S. Cl.
CPC .............. *F16H 37/042* (2013.01); *B02C 18/24* (2013.01); *F16H 3/093* (2013.01); *F16H 35/10* (2013.01); *F16H 2003/0935* (2013.01)

(58) Field of Classification Search
USPC .......................................................... 74/664
See application file for complete search history.

(56) References Cited

U.S. PATENT DOCUMENTS

| 4,619,407 A * | 10/1986 | Goldhammer ................... 241/30 |
| 6,854,673 B2 * | 2/2005 | Strutz et al. .............. 241/46.013 |
| 8,288,897 B1 * | 10/2012 | Lo .................................. 307/131 |
| 2003/0057305 A1* | 3/2003 | Watano et al. ................... 241/36 |
| 2006/0050604 A1* | 3/2006 | Brunazzi et al. ................ 366/20 |
| 2008/0105510 A1* | 5/2008 | Burlington et al. ............. 192/20 |
| 2010/0242647 A1* | 9/2010 | Okadome et al. ............... 74/331 |

FOREIGN PATENT DOCUMENTS

DE 4206325 A1 * 10/1992

OTHER PUBLICATIONS

English machine translation of DE 4206325 A1.*

* cited by examiner

*Primary Examiner* — Dirk Wright
(74) *Attorney, Agent, or Firm* — Crowell & Moring LLP

(57) ABSTRACT

A transmission for shredding machines includes a drive shaft, a driven shaft, and an intermediate shaft, with at least two spur gears each, at least one hydraulic shift clutch each, and at least one overload clutch. The shafts can releasably be coupled with each other via the spur gears and the hydraulic shift clutches, and the driven shaft can releasably be coupled with an output shaft by way of the overload clutch.

20 Claims, 10 Drawing Sheets

TRANSMISSION FOR USE IN SHREDDING MACHINES

This application claims priority under 35 U.S.C. §119 to German Utility Model Patent Application 20 2013 004 051.3, filed Apr. 29, 2013, the entire disclosure of which is incorporated herein by reference.

BACKGROUND OF THE INVENTION

Field of the Invention

The following invention relates to a transmission for shredding machines, as they are used for example for shredding compost material.

In operation of shredding machines, it regularly is required to change the direction of rotation of the rotatable shredding tools or rollers in order to avoid, prevent, or release a blockage. In this way, it is also possible to achieve better shredding results. In particular, by repeatedly changing the direction of rotation of the rotatable shredding tools, fast shredding can be achieved with bulky shredding material.

In known slowly running shredding machines, hydraulic drives often are used in order to provide a load limitation and a simple possibility of reversing. This type of shredding machine, however, has an unfavorable efficiency. This becomes noticeable, among other times, when the shredding machine must perform frequent changes of the direction of rotation of the shredding tools.

The systems known at present are divided into two classes. One such class includes shredding machines with hydraulic drives, which have a very high functionality as well as the advantage of a continuous speed and torque adjustment.

Another class of systems includes mechanical drive systems with simple transmissions, which can turn out to be disadvantageous when blockages occur in the shredding machine, which then can stall the drive motor of the shredding machine. Furthermore, mechanical systems mostly have only one fixed operating point of the drive train defined by the gear ratio, i.e. a fixed rotational speed with a fixed torque. This point is a compromise setting for all materials, i.e. for the different input materials of the shredding machine. Due to this, the rotational speed of the shredding machine, on the one hand, may be too low for materials that are easy to shred, while, on the other hand, the torque may be too low for materials which are difficult to shred.

SUMMARY OF THE INVENTION

It is one object of the present invention to provide a transmission for a shredding machine, which eliminates the above-mentioned disadvantages of the shredding machines known from the prior art.

In accordance with the invention, this object is solved by an apparatus with features claimed. Accordingly, there is provided a transmission for a shredding machine including a drive shaft, a driven shaft, and an intermediate shaft, with at least two spur gears each and at least one hydraulic shift clutch each, and with at least one overload clutch. The shafts can releasably be coupled with each other via the spur gears and via the hydraulic shift clutches, and the driven shaft can releasably be coupled with an output shaft by way of the overload clutch.

In the case of an overload, i.e. when, for example, materials that are difficult to shred or that are not shreddable at all are seized by the shredding machine, the overload clutch advantageously provides for uncoupling the driven shaft and the shredding shaft or the output shaft from each other. This prevents stalling of a diesel engine, or the destruction of the shift clutch in the case of an electric motor.

In a preferred embodiment, it is conceivable that the transmission comprises three gears, whereas in a particularly preferred exemplary embodiment the three gears comprise two gears in the same direction, wherein a first gear has a smaller step-down ratio and a second gear has a step-up ratio, and wherein a third gear is a gear directed opposite to the first and the second gear.

The first gear can be suitable for material that is difficult to shred by having it be a slowly rotating gear with a relatively high torque. The second gear, on the other hand, can be a gear rotating faster with a lower torque, which is particularly suitable for material that is easy to shred. With the third gear, finally, it is possible, for example in the case of a blockage, to reverse the rollers of the shredding machine.

In a further preferred embodiment it is conceivable that in the first gear the pressure in the overload clutch is higher than in the second gear.

As a result, the overload clutch will slip earlier in the second gear than in the first gear, when a blockage of the rollers occurs or threatens to occur. Stalling of the drive motor thereby is prevented better, because the system can be adjusted to the respectively used drive motor.

In a likewise preferred embodiment it is conceivable that the overload clutch is provided outside a main housing of the transmission.

In the case of a defect, the overload clutch therefore can easily be replaced advantageously for example by opening a corresponding lid. An overload clutch, which is designed such that it reaches a service life of about 10,000 operating hours, is conceivable. Up to this point, about 500,000 blockages are expected, at which the overload clutch will slip. Other specifications are of course likewise conceivable and can be realized in accordance with the invention.

In a preferred embodiment, it is furthermore conceivable to provide a speed sensor for checking a slip of the overload clutch before and after disengaging and engaging the overload clutch.

Due to the speed sensor, it thus is advantageously possible to increase the operational safety by monitoring the movement behavior of the transmission.

In a further preferred embodiment, it is conceivable that the transmission comprises a manual or an integrated automatic gearshift mechanism.

Shifting here can be effected via multidisk clutches running in oil or actuated hydraulically. This means that for each of the three gears, one multidisk clutch each is integrated. In a manual embodiment, shifting is effected by a preselection of the user of the transmission or of the shredding machine.

In a particularly preferred embodiment, it is conceivable that the integrated automatic gearshift mechanism shifts into the first gear when it has previously been blocked in the second gear within a defined period, with the integrated automatic gearshift mechanism again shifting from the first into the second gear when a defined load factor of the drive motor has not been exceeded within a defined period.

It thereby advantageously is achieved that the shredding machine automatically can react to the properties of the material to be shredded, and, in the case of materials that are difficult to shred, automatically shifts into the first gear, which provides a greater torque and thus is more suitable to shred materials which are difficult to shred. At the same time, it becomes possible to automatically shift into the faster running second gear, which with its lower torque is designed for materials easier to shred.

In a further preferred embodiment, it is conceivable that, with a blocked output shaft, the overload clutch will only disengage after a defined period, in order to maintain the torque of material to be shredded.

Advantageously, the drive motor is not stalled when there is a blockage of the output shaft due, for example, to materials that are difficult to shred, and in this way the shift clutches of the transmission are not loaded.

In a likewise preferred embodiment, with a slipping overload clutch, the full torque can be transmitted to the output shaft. Advantageously, this can provide for shredding of the material to be shredded at almost a standstill of the shredding roller by maintaining the torque.

In another embodiment it is furthermore conceivable to provide a controller for calculating the temperature of the overload clutch.

When the overload clutch slips, the power is introduced into the disks of the over-load clutch as frictional heat. When the overload clutch slips very often a number of times in a row, this heat possibly can no longer be dissipated adequately, and there is a risk that the clutch will be destroyed thermally. The controller for calculating the temperature makes it possible to prolong the reversing time of the rollers, in which the overload clutch is cooled via the cooling oil, with reference to the current temperature of the transmission. A thermal destruction of the overload clutch thereby can be prevented.

The use of a transmission and a shredding machine are also considered to be part of the invention.

BRIEF DESCRIPTION OF THE DRAWINGS

Further details and advantages of the present invention will be described with reference to exemplary embodiments illustrated in the drawings.

DETAILED DESCRIPTION OF THE INVENTION

Figure 1:
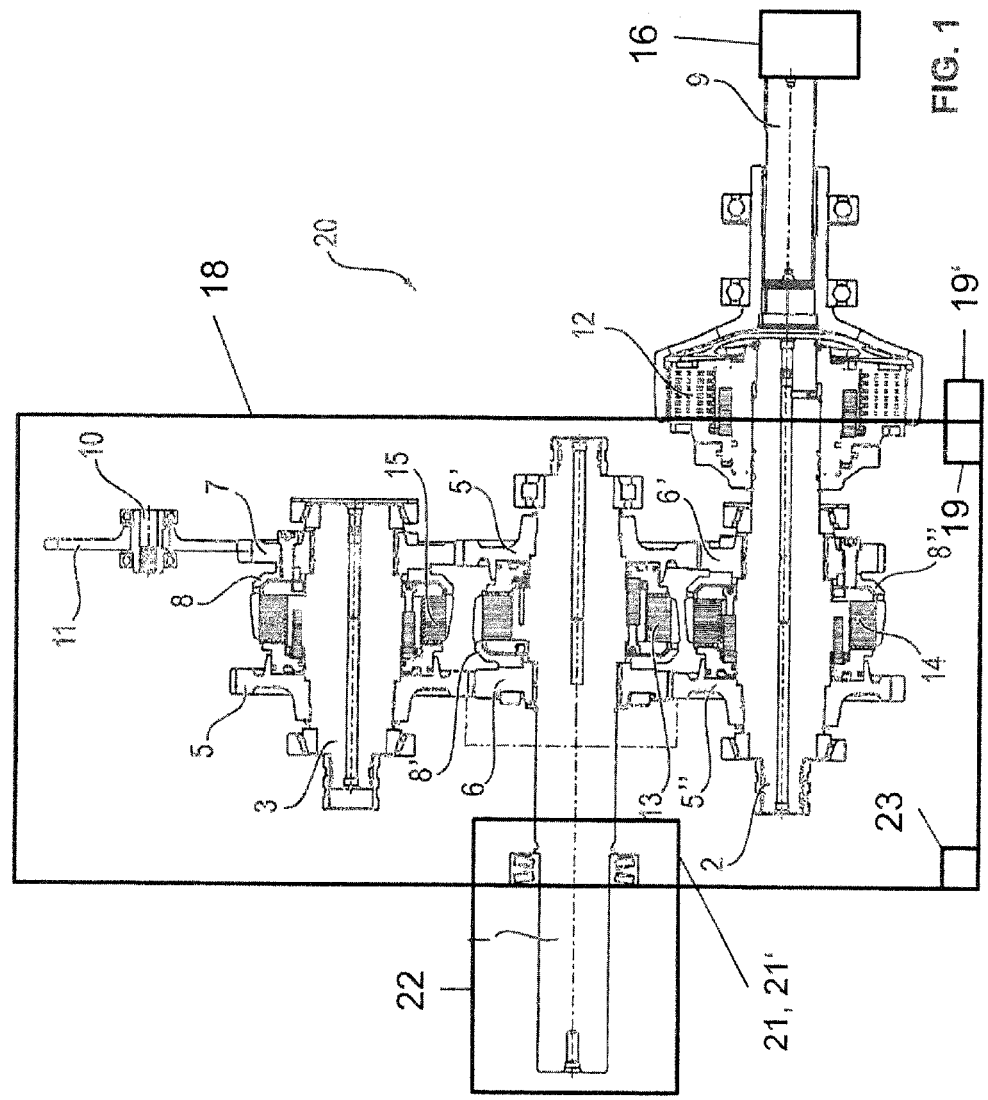
FIG. 1 shows a first exemplary embodiment of the transmission according to the invention.

FIG. 1 shows a first embodiment of the transmission 20, comprising a drive shaft 1, a driven shaft 2 and an intermediate shaft 3 with at least two spur gears 5, 5', 5", 6, 6', 7 each, one reverse gear 8, 8', 8" each, and with at least one hydraulic shift clutch 13, 14, 15 each. At the driven shaft 2 the overload clutch 12 is provided, which releasably couples the driven shaft 2 with the output shaft 9. In the upper region of the arrangement, there is furthermore shown another shaft 10 with a spur gear 11 mounted thereon, which can be provided for connecting a drive source with a further application branched off. A planetary transmission 16, a main transmission housing 18, outside of which the overload clutch 12 is provided, speed sensors 19, 19', a manual gearshift mechanism 21, an integrated automatic gearshift mechanism 21', a drive motor 22, and a controller 23 are all illustrated, in schematic fashion, in FIG. 1.

Figure 2:
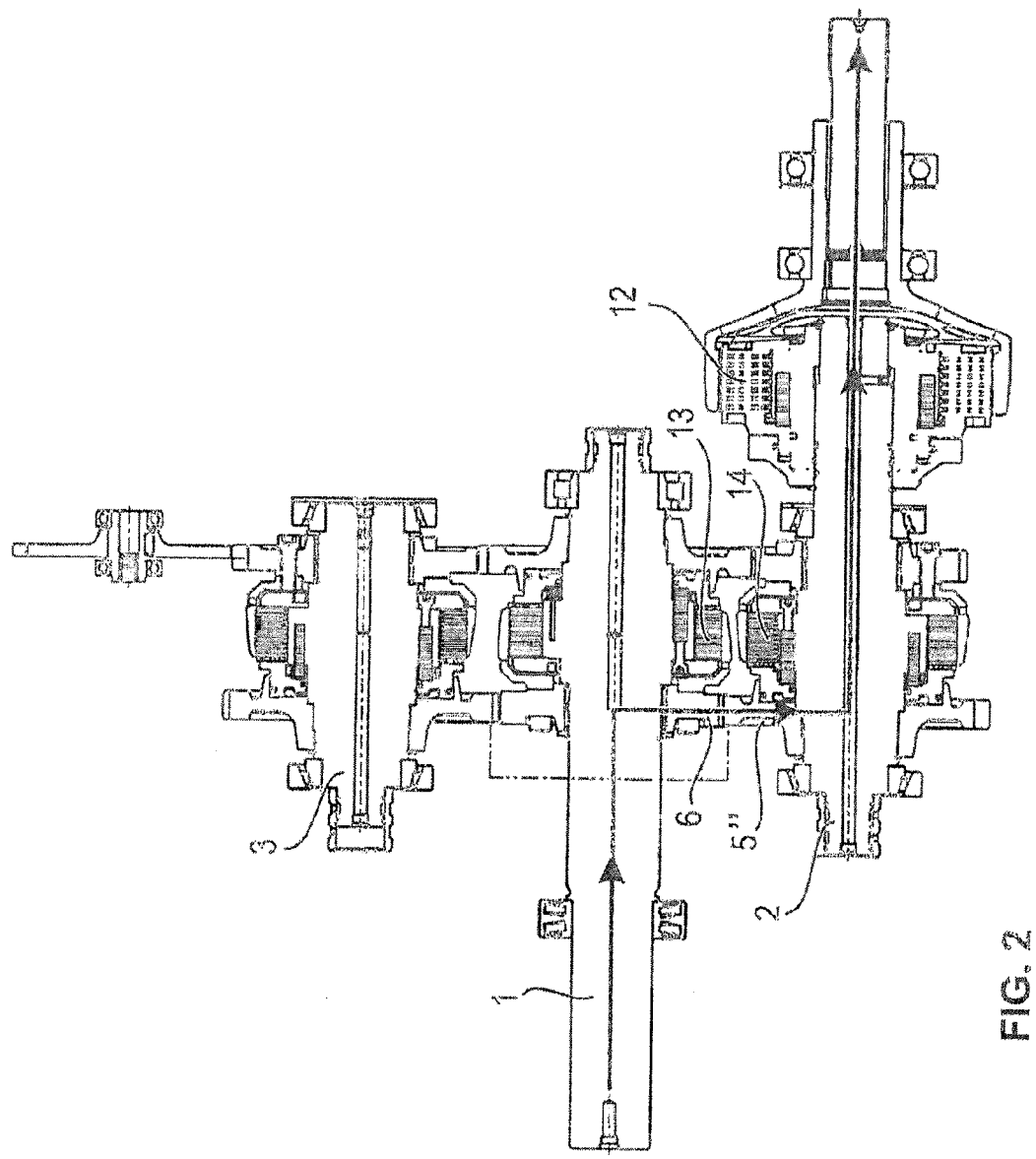
FIGS. 2 to 4 show fluxes of force in various gears of the first exemplary embodiment of the transmission.

FIG. 2 shows the flux of force in the first embodiment of the transmission 20, when the first gear is engaged. The drive shaft 1 here is coupled directly with the driven shaft 2 via the spur gears 5" and 6, the hydraulic shift clutches 13 and 14 of drive shaft 1 and driven shaft 2 are shifted correspondingly. The intermediate shaft 3 is not involved in the power transmission, the overload clutch 12 is engaged, so that the roller of the shredding machine is rotatable in a slow, but high-torque gear.

Figure 3:
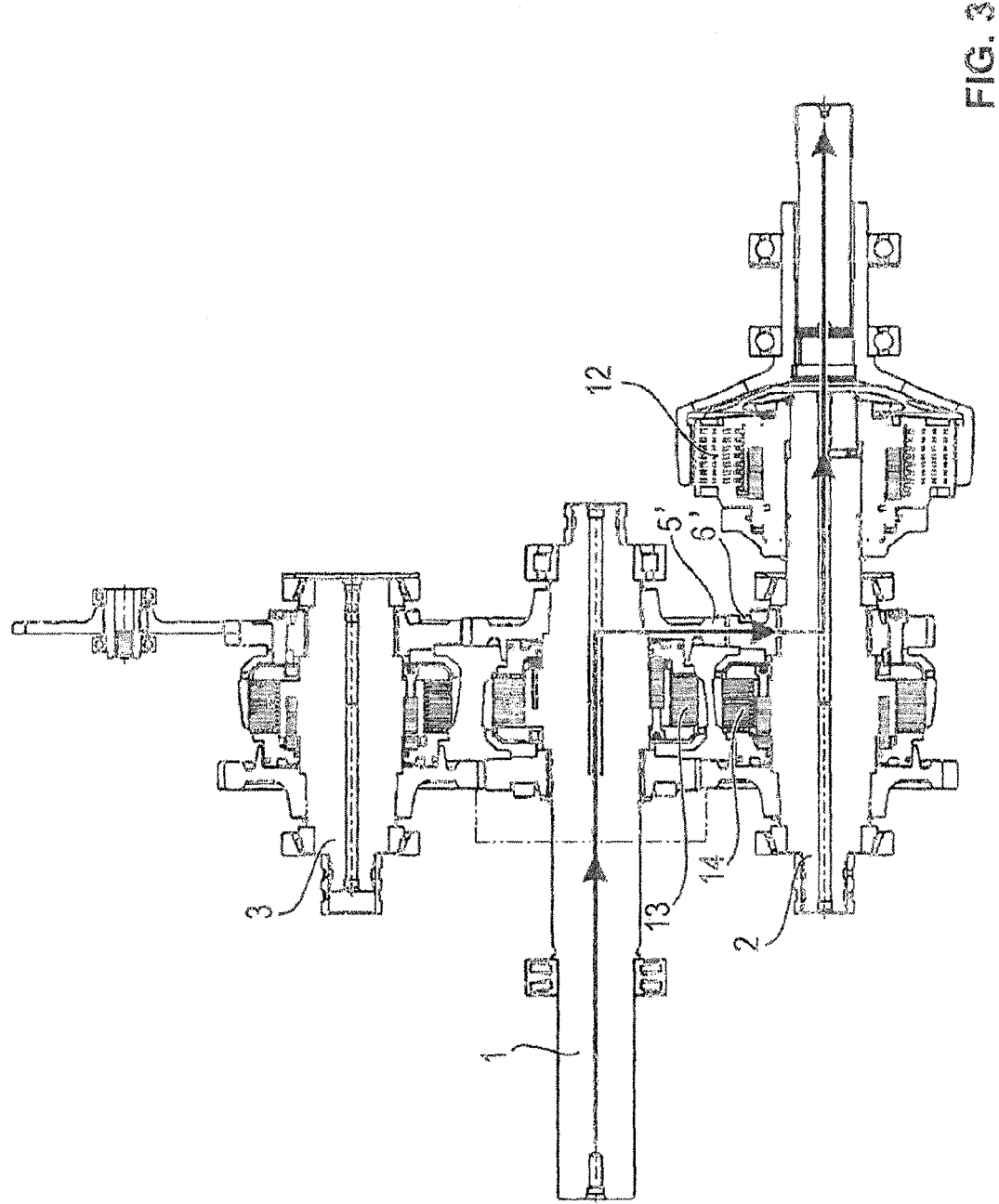

FIG. 3 shows the same embodiment, but in which the second gear is engaged. For this purpose, the drive shaft 1 and the driven shaft 2 are coupled with each other via the spur gears 6' and 5'. It should be noted here that both the drive shaft 1 and the driven shaft 2 each include one spur gear 5 and one spur gear 6.

Figure 4:
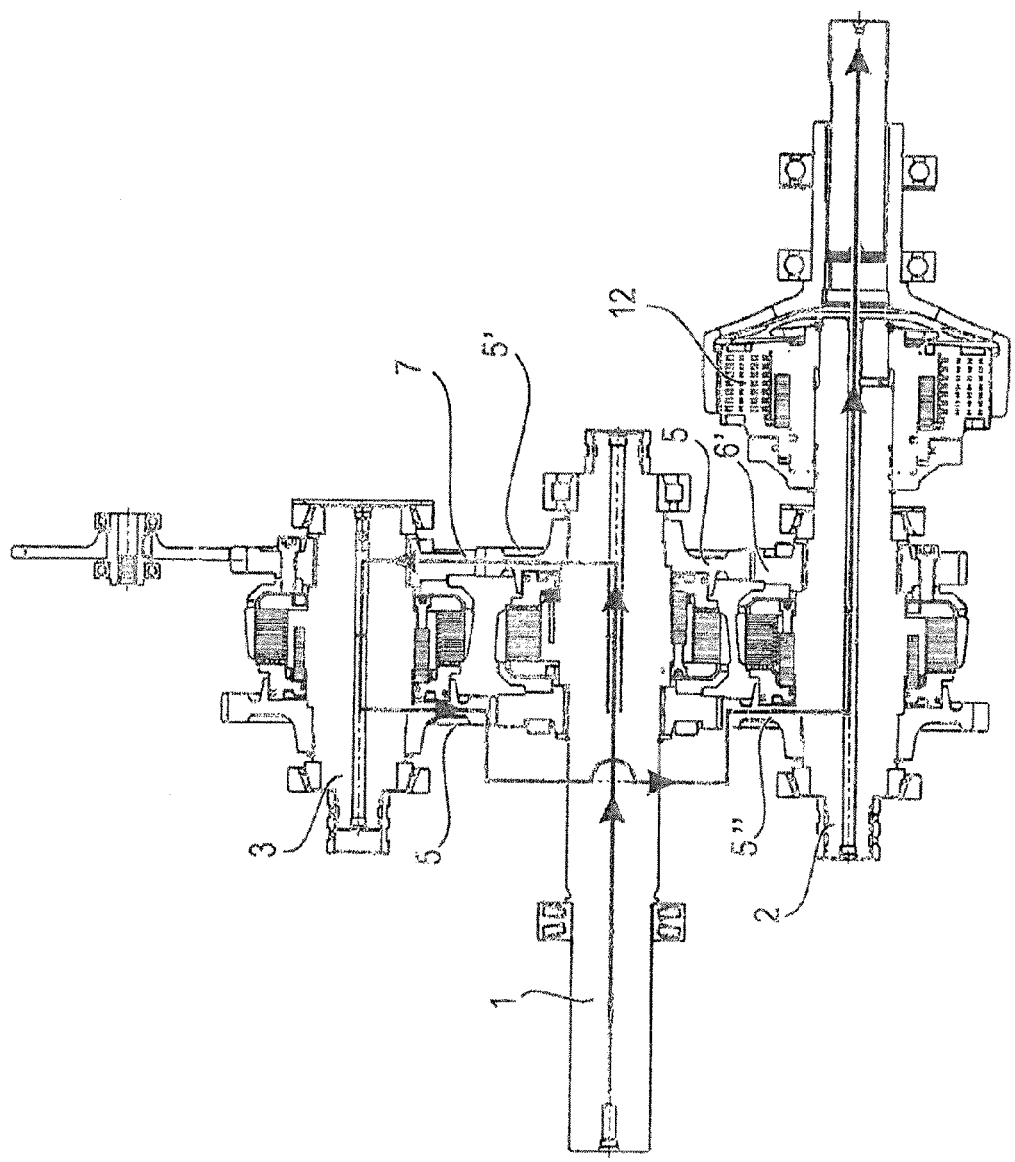

FIG. 4 shows the flux of force with engaged reverse gear of the first exemplary embodiment of the transmission 20. The drive shaft 1 here initially is coupled with the intermediate shaft 3 via the spur gears 5' and 7. The intermediate shaft 3 in turn is coupled with the driven shaft 2 via the spur gears 5 and 5.

Figure 5:
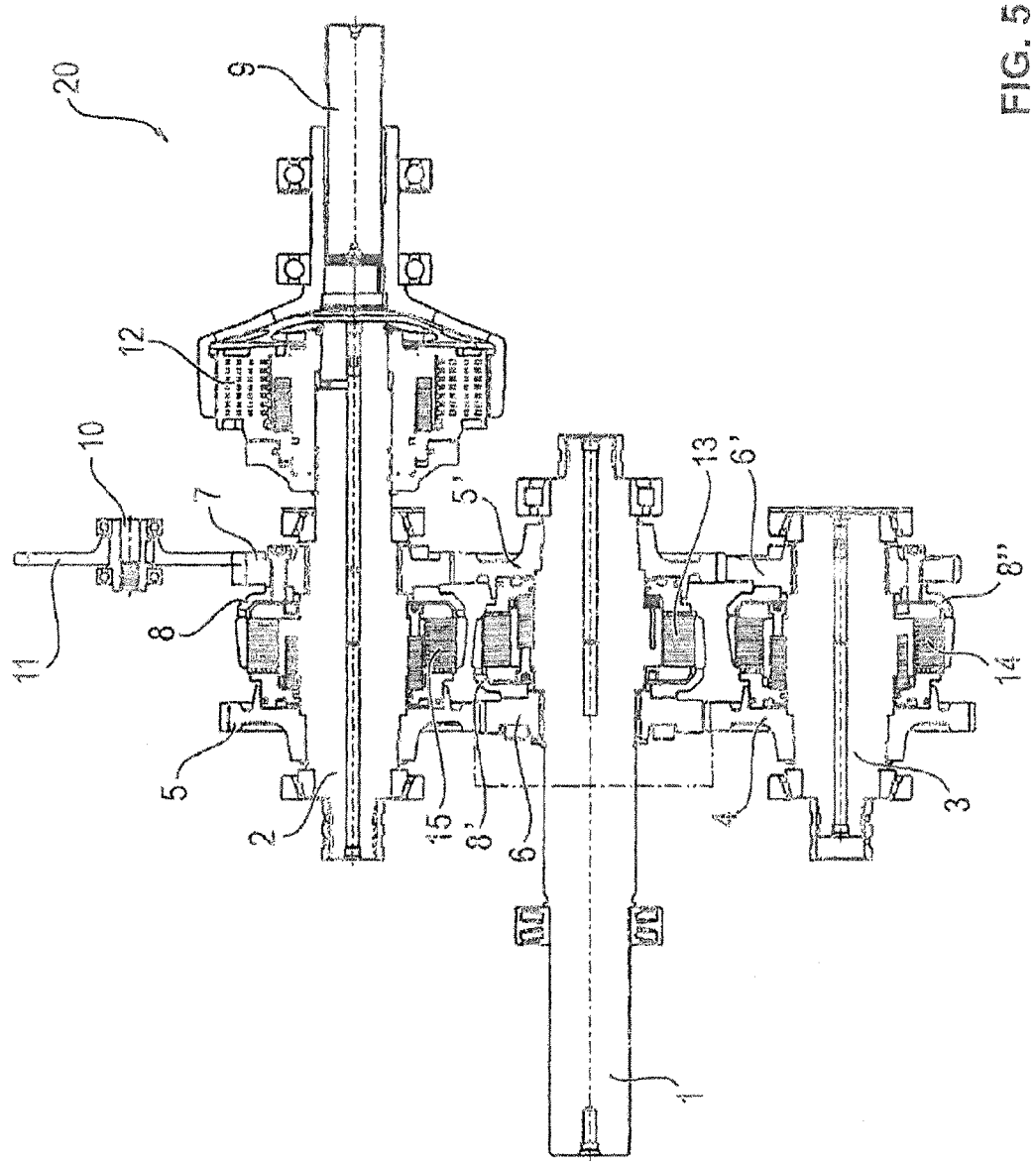
FIG. 5 shows a second exemplary embodiment of the transmission according to the invention.
Figure 6:
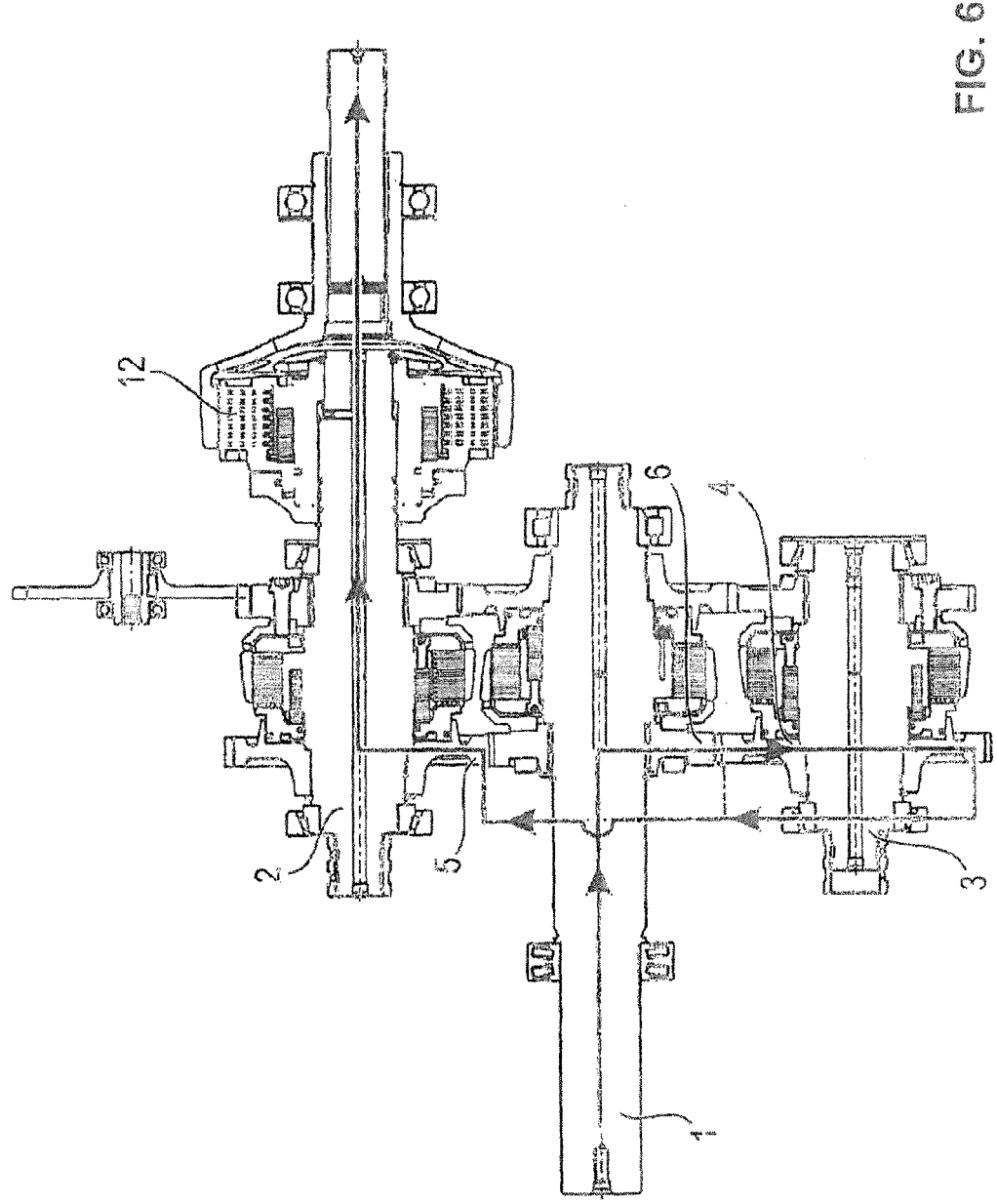
FIGS. 6 to 8 show fluxes of force in various gears of the second exemplary embodiment of the transmission.
Figure 7:
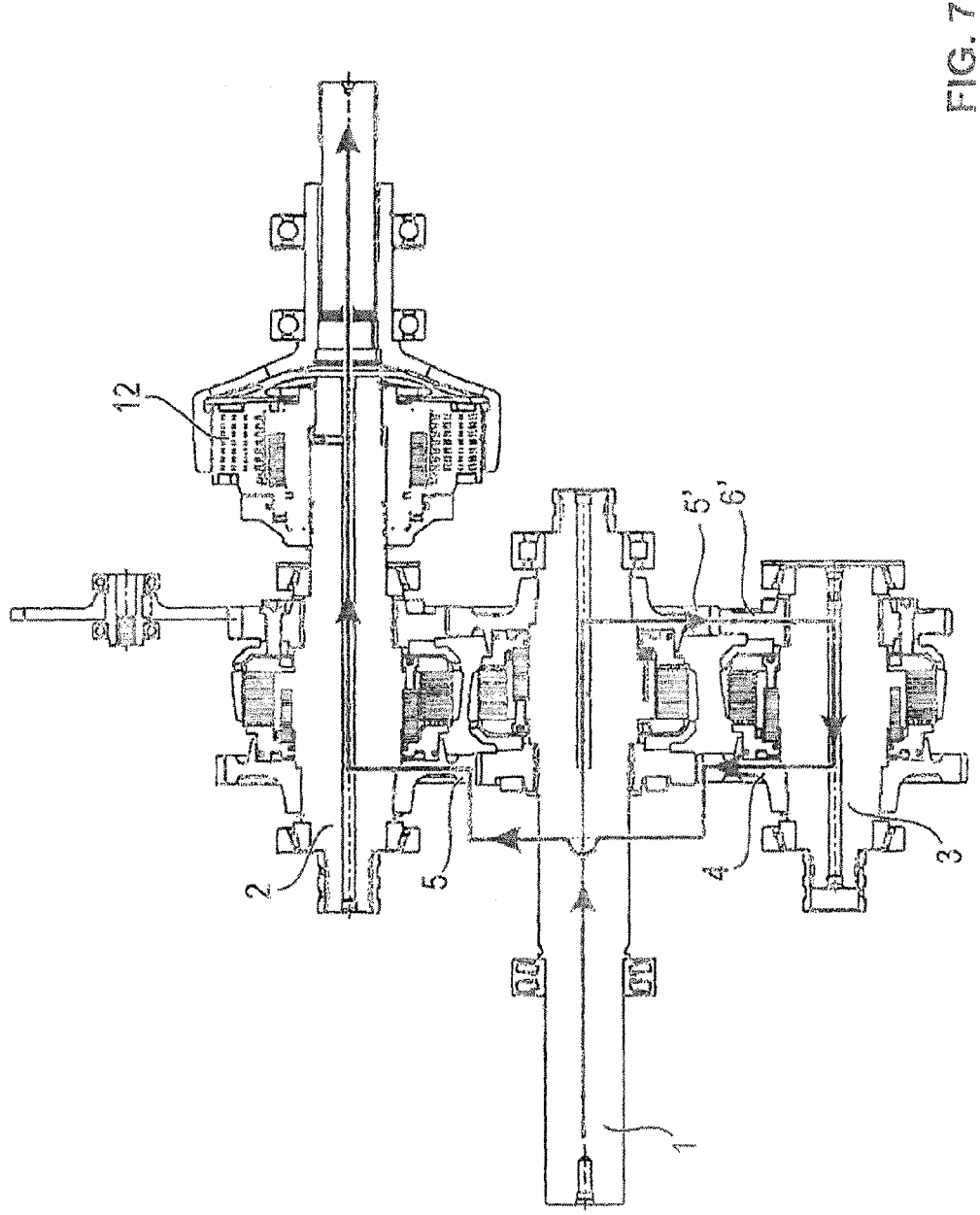
Figure 8:
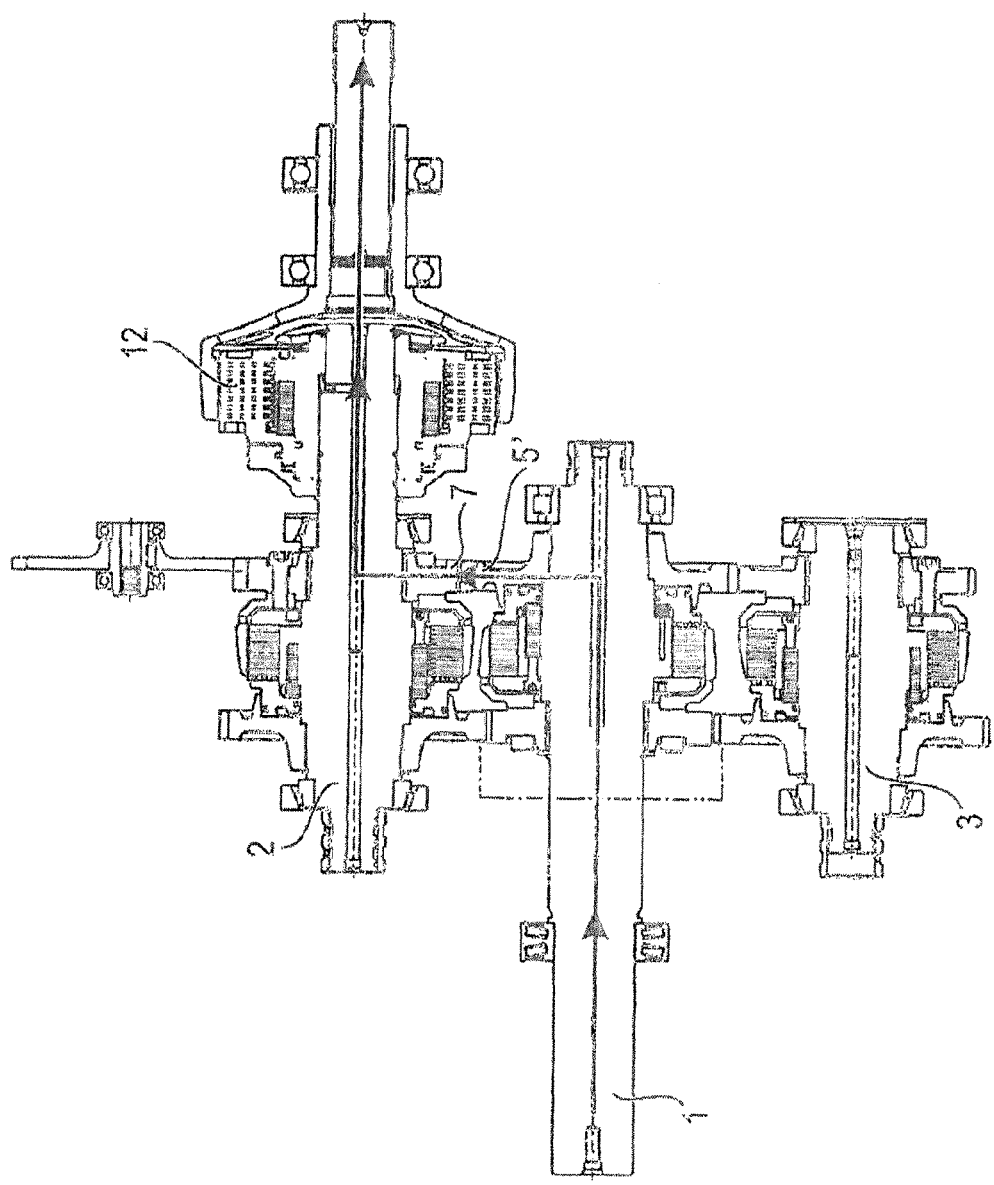

FIG. 5 shows a second embodiment of the transmission 20, in which the additional shaft 10 is not coupled with the intermediate shaft 3, but with the driven shaft 2 (left and right transmission in the shredder). The flux of force in the second exemplary embodiment of the transmission 20 is effected analogous to the first exemplary embodiment and is shown in FIGS. 6 (1st gear), 7 (2nd gear) and 8 (reverse gear).

Figure 9:
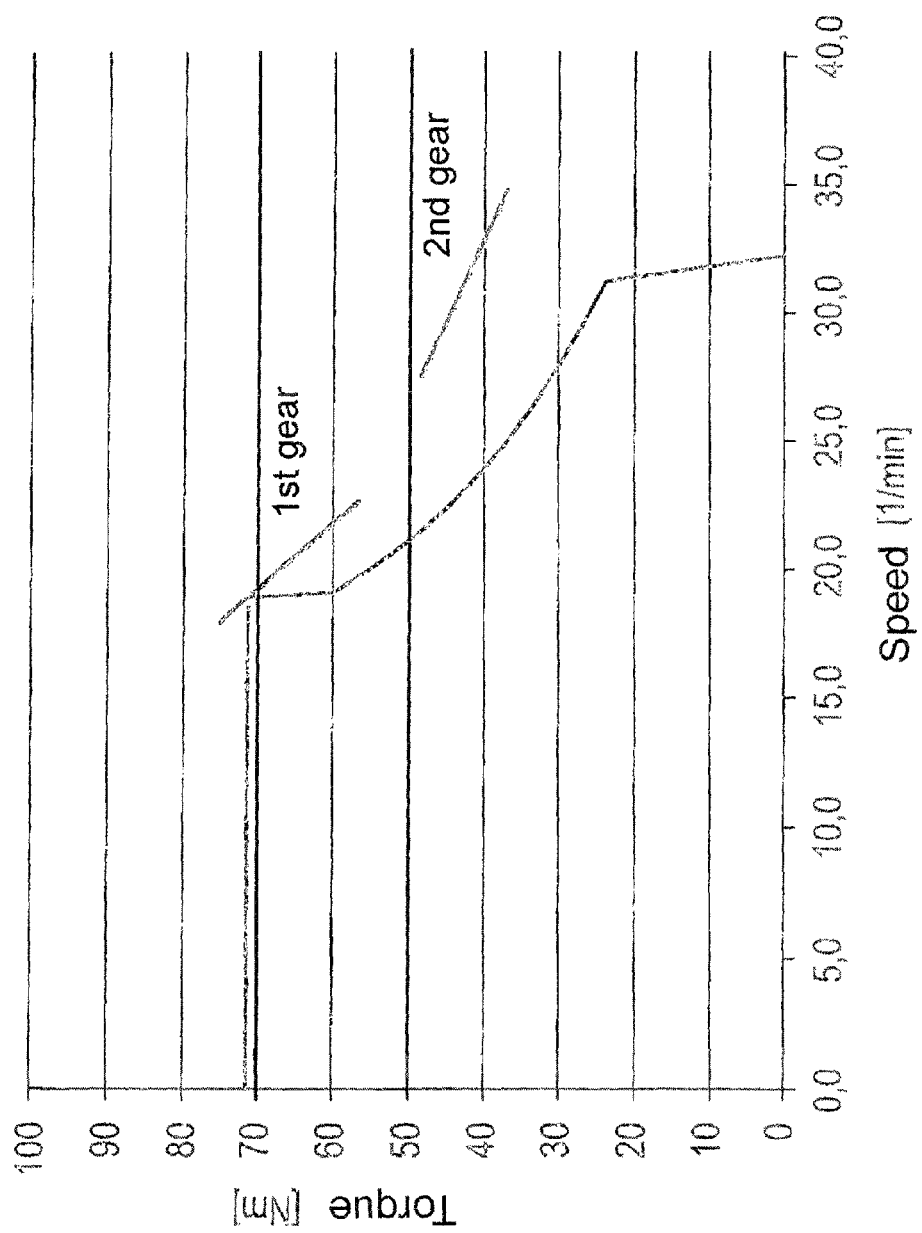
FIG. 9 shows a torque/speed diagram of the transmission.

FIG. 9 shows a torque/speed diagram. It can be seen that in the first gear of the transmission 20 a higher torque can be provided than in the second gear, namely in the illustrated exemplary embodiment of 75 kN/m, but this increased torque is accompanied by a reduced speed of 23 revolutions per minute. The illustrated range is achieved by the power reduction of the diesel engine. In the case of an electric motor as drive, this would be two operating points in the diagram.

In the faster second gear, however, which reaches a speed of about 28 to 35 revolutions per minute, only a reduced torque can be provided, which in the illustrated exemplary embodiment is about 49 kN/m.

Figure 10:
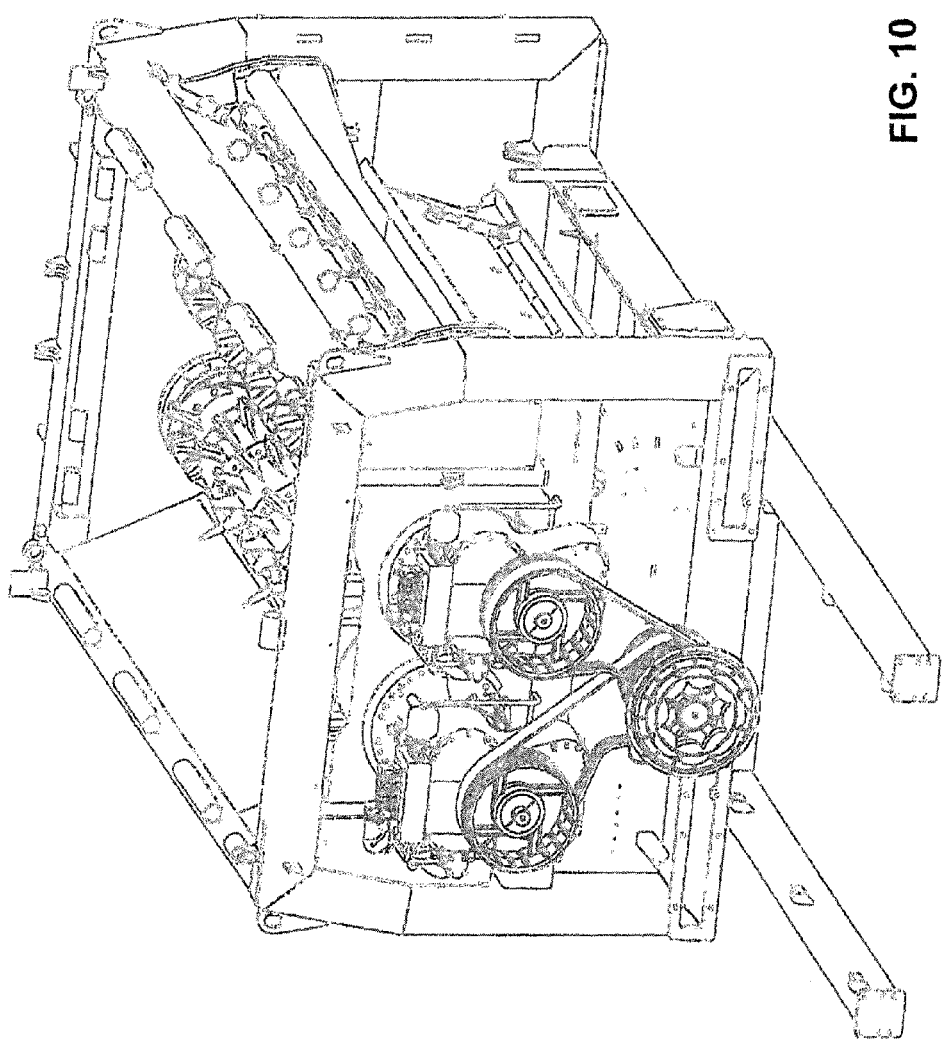
FIG. 10 shows a view of the installed transmission (left and right version).

FIG. 10 shows a shredding machine with transmissions 20 mounted therein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A transmission for shredding machines, comprising:
a drive shaft,
a driven shaft,
an intermediate shaft,
exactly two spur gears for each of the shafts,
at least one hydraulic shift clutch for each of the shafts, and
at least one overload clutch,
wherein the shafts can be releasably coupled with each other via the spur gears and the hydraulic shift clutches, and
wherein the driven shaft can be coupled with a planetary transmission and a shredding shaft by way of the overload clutch.

2. The transmission according to claim 1, wherein the spur gears provide the transmission with three shift gears.

3. The transmission according to claim 2, wherein the three shift gears comprise two shift gears for movement in the same direction, including a first shift gear having a step-down ratio and a second shift gear having a step-up ratio, and a third shift gear for movement in a direction opposite to the movement direction of the first and second shift gears.

4. The transmission according to claim 3, wherein, in the first shift gear having the step-down ratio, the pressure in the overload clutch is higher than in the second shift gear having the step up ratio so that the overload clutch will slip earlier in the second shift gear than in the first shift gear.

5. The transmission according to claim 1, wherein the overload clutch is provided outside a main housing of the transmission.

6. The transmission according claim 1, further comprising two speed sensors provided for checking a slip of the overload clutch before and after disengaging and engaging the overload clutch.

7. The transmission according to claim 3, wherein the transmission comprises a manual gearshift mechanism or an integrated automatic gearshift mechanism.

8. The transmission according to claim 7, wherein the transmission includes an integrated automatic gearshift mechanism that shifts into the first shift gear when the integrated automatic gearshift mechanism has previously been blocked in the second shift gear within a defined period, and wherein the integrated automatic gearshift mechanism again shifts from the first shift gear into the second shift gear when a defined load factor of the drive motor has not been exceeded within another defined period.

9. The transmission according to claim 1, wherein the overload clutch includes an output shaft, and wherein when the output shaft is blocked, the overload clutch will only disengage after a defined period in order to maintain torque on material to be shredded.

10. The transmission according to claim 9, wherein, when the at least one overload clutch slips, maximum torque is transmittable to the output shaft.

11. The transmission according to claim 1, further comprising a controller provided for calculating a temperature of the overload clutch.

12. The transmission according to claim 2, wherein the overload clutch is provided outside a main housing of the transmission.

13. The transmission according claim 2, further comprising two speed sensors provided for checking a slip of the overload clutch before and after disengaging and engaging the overload clutch.

14. The transmission according to claim 4, wherein the transmission comprises a manual gearshift mechanism or an integrated automatic gearshift mechanism.

15. The transmission according to claim 14, wherein the transmission includes an integrated automatic gearshift mechanism that shifts into the first shift gear when the integrated automatic gearshift mechanism has previously been blocked in the second shift gear within a defined period, and wherein the integrated automatic gearshift mechanism again shifts from the first shift gear into the second shift gear when a defined load factor of the drive motor has not been exceeded within another defined period.

16. The transmission according to claim 2, wherein the overload clutch includes an output shaft, and wherein when the output shaft is blocked, the overload clutch will only disengage after a defined period in order to maintain torque on material to be shredded.

17. The transmission according to claim 16, wherein, when the at least one overload clutch slips, maximum torque is transmittable to the output shaft.

18. The transmission according to claim 2, further comprising a controller provided for calculating a temperature of the overload clutch.

19. The transmission according claim 3, further comprising two speed sensors provided for checking a slip of the overload clutch before and after disengaging and engaging the overload clutch.

20. A shredding machine including at least one transmission according to claim 1.

* * * * *